(12) United States Patent
Leung

(10) Patent No.: US 12,716,805 B2
(45) Date of Patent: Aug. 25, 2026

(54) SYSTEM AND METHOD FOR DETERMINING WEAR ON ELECTRONIC COMPONENTS BASED ON RANDOM VIBRATION DATA ANALYSIS DURING TRANSPORT

(71) Applicant: Google LLC, Mountain View, CA (US)

(72) Inventor: King Hei Leung, Palo Alto, CA (US)

(73) Assignee: Google LLC, Mountain View, CA (US)

(*) Notice: Subject to any disclaimer, the term of this patent is extended or adjusted under 35 U.S.C. 154(b) by 449 days.

(21) Appl. No.: 18/234,447

(22) Filed: Aug. 16, 2023

(65) Prior Publication Data

US 2025/0060274 A1 Feb. 20, 2025

(51) Int. Cl.
*G01M 7/02* (2006.01)

(52) U.S. Cl.
CPC .................................... *G01M 7/02* (2013.01)

(58) Field of Classification Search
None
See application file for complete search history.

(56) References Cited

U.S. PATENT DOCUMENTS 8,396,687 B2 3/2013 Vock et al.
8,862,393 B2 10/2014 Zhou et al.
8,930,074 B1 * 1/2015 Lin .................... B60G 17/0165 701/36
2007/0229248 A1 10/2007 Mott et al.
2017/0138816 A1 * 5/2017 Proulx .................. G01M 7/027
2020/0406925 A1 12/2020 Du et al.
2025/0051152 A1 * 2/2025 Zhang ..................... B66F 9/063

OTHER PUBLICATIONS

Tom Irvine, Power Spectral Density Units: [ G^2 / Hz], Revision B (Mar. 15, 2007) 8 pages.
Tom Irvine, the Fast Fourier Transform (FFT) (Nov. 15, 1998) 34 pages.
Tom Irvine, Rainflow Cycle Counting in Fatigue Analysis, Revision B (Oct. 4, 2018) 6 pages.

* cited by examiner

*Primary Examiner* — Suman K Nath
(74) *Attorney, Agent, or Firm* — Lerner David LLP

(57) ABSTRACT

The technology is generally directed to determining fatigue damages to an electronic component or a hardware system caused by the transport or movement of the electronic component or hardware system. The electronic components may be, for example, data center hardware components. The electronic components are susceptible to fatigue damage resulting from thermal, shock and vibration events. The thermal, shock, and vibration events may occur, for example, during transport or movement of the electronic components. To fully characterize fatigue, the acceleration and stress cycles may be tracked, which correlate with natural phenomena in the global supply chain and data center environment.

20 Claims, 8 Drawing Sheets

SYSTEM AND METHOD FOR DETERMINING WEAR ON ELECTRONIC COMPONENTS BASED ON RANDOM VIBRATION DATA ANALYSIS DURING TRANSPORT

BACKGROUND

In an era where electronic components are smaller, denser, and more complicated structurally, data center hardware can be impacted by handling and shipping as it is transported through the global supply chain. The process of handling and shipping exposes these sensitive components to a wide range of environmental conditions and mechanical stress.

Random vibrations occurring during transportation of datacenter hardware and components can affect the durability of the hardware and components. For example, the vibrations can lead to the accumulation of fatigue damage in the hardware, components, solder joints, printed circuit boards, interconnects, fasteners, and structural elements. The repetitive exposure to these vibrations during transit can gradually weaken the structural integrity of the components, resulting in failures and operational (reliability) issues in the data center hardware.

Current specifications for shock and vibration in data center hardware may indicate that products only need to be subjected to a standard suite of shock and vibration tests to meet global supply chain and data center robustness requirements. Shock and vibration tests can be useful as screening tools in cases where there is an understanding of the transport system. The transport system may include, for example, environmental factors, individual components, chassis, racks, and packaging. However, these standard shock and vibration tests typically fail to represent critical characteristics and details of the actual environment, and they fail to acknowledge the tremendous amount of engineering involved in structural design, analysis, and testing. Moreover, several industry trends significantly impact the field. 1. Products became much more complicated structurally in the last five years due to the end of Moore's Law and 2. components are smaller, denser, run with lower power, and 3. new materials and fabrication methods could lead to components and hardware systems being potentially more fragile under mechanical stress. Highly Accelerated Life Testing (HALT) and Highly Accelerated Stress Screening (HASS), which allow products to be designed for significantly and arbitrarily high levels of robustness, are gaining popularity over traditional shock and vibration testing methods, but they too are standard test suites with the same shortcomings. At the same time, the global supply chain continues to be exponentially more intricate than ever before.

SUMMARY

Aspects of the disclosed technology may include a method, apparatus or system for characterizing real world random vibration conditions. Examples of such vibration conditions can include transport through a global supply chain, movement by equipment, machinery, robots, people, etc. In some examples, such vibration conditions can include movement of a wearable device as it is worn by a user. Information gained from such characterization may be used to determine fatigue damages to an electronic component and hardware system caused by transport of the electronic component. The disclosure further provides for determining optimal shipping routes and methods to minimize fatigue damages while also minimizing other shipping factors such as weight, size, cost, time, etc. The methods may include, for example, different types of transport vehicles. The different routes may be determined, for example, based on the type of transport vehicle. In some examples, the routes and/or methods may be determined based on external factors, such as the time of year, weather during the period of travel, or the like.

An aspect of the disclosure provides the method for determining fatigue damages to an electronic component caused by transport of the electronic component may comprise measuring, during transport of the electronic component, vibration data from one or more portable vibration data acquisition units, each portable vibration data acquisition unit comprising one or more sensors located in proximity to the electronic component, processing, with one or more processors, the vibration data, the processing comprising rainflow counting and bandpass filtering and peak detection and timing detection, and determining, with the one or more processors, the fatigue damages to the electronic components based on the processed vibration data, the determined fatigue damages being correlated to segments of the transport. Such methods can also be used in lab environments for testing purposes.

The method may further comprise storing the vibration data in a storage of each portable vibration data acquisition unit; and transmitting the stored vibration data to the one or more processors over a network.

According to some examples, the processing of the vibration data may further comprise extracting a specific frequency range of the vibration data; generating acceleration cycle counts by identifying a maximum value and minimum value in the specific frequency range; generating time history information by identifying the exact timing of each acceleration cycle; calculating statistical information based on the amplitude and timing of acceleration cycles for as many frequency ranges as needed; and generating 3D visualizations of the data over time.

According to some examples, determining the fatigue damages may comprise predicting a stress cycle per unit time by analyzing the acceleration cycles. According to some examples, the determining the fatigue damages may comprise a test pass rate for a specific test profile. According to some examples, determining the fatigue damages may comprise predicting a robustness in electronic component or hardware system by providing information of durability under a specific condition in a specific supply chain. According to some examples, the determining the fatigue damages may further comprise predicting optimization information for a packaging and the optimization information for the packaging may comprise determining a material and design of packaging.

According to some examples, the one or more portable vibration data acquisition units may be attached to the floor or critical structural elements of a vehicle transporting the electronic component. According to some examples, the one or more portable vibration data acquisition units may be located in a package of electronic components or a hardware system.

According to some examples, the vehicle transporting the electronic component may be a car, freight, ship, or plane, or any equipment, machinery, or robot that moves from one physical location to another. According to some examples, the segment of the transport is a plurality of distance ranges from one point to the other within a specific time frame during transport of the electronic component.

Another aspect of the disclosure provides for a system for determining fatigue damages to an electronic component caused by transport of the electronic component comprising one or more portable vibration data acquisition units comprising one or more sensors configured to detect vibration data during transport of the electronic component. The system may further include one or more processors. The one or more processors may be configured to process the vibration data; and determine the fatigue damages to the electronic components based on the processed vibration data, wherein the processing the vibration data comprises rainflow counting and bandpass filtering and any peak detection methods and timing logging methods, and the determined fatigue damages are correlated to segments of the transport.

DETAILED DESCRIPTION

The technology is generally directed to determining fatigue damages to an electronic component caused by the transport of the electronic component and hardware system. The electronic components may be, for example, data center hardware components. The electronic components are susceptible to fatigue damage resulting from thermal, shock and vibration events. The thermal, shock, and vibration events may occur, for example, during transport of the electronic components. To fully characterize fatigue, the stress cycles may be tracked, which correlate with natural phenomena in the global supply chain and data center environment.

Environmental conditions that the electronic components are exposed to during transport may be used to set product requirements properly and design lab experiments to prevent fatigue of the electronic components. Typical methods of random vibration data analysis, such as Fast Fourier Transform (FFT) or Bandpass Filtering, provide high level summaries of the data. These summaries allow users to quickly understand the frequency content within the data. However, additional data or information is required to understand the fatigue damages to the electronic component. For example, additional data relating to time history information during the calculations and more robust details of frequency, amplitude, and occurring time are useful when determining the fatigue damage of the electronic component. Typically, the prior methods for testing random vibration data and determining fatigue damages typically assume the distribution of the data is consistent or "stationary" from beginning to the end, which is not true for many real-world transportation environments. The prior methods typically assume a uniform distribution of data among the frequency bands, which is also not accurate for many real-world environments. The prior methods typically produce a signal or a motion with specific distribution of amplitude, timing, and frequency in a computer simulation or a shaker table, which may not impact a design or prototype the way real-world environments would. As environmental conditions are not consistent, the technology described herein determines the fatigue damages to an electronic component and hardware system without assuming constant or consistent conditions. This may provide for a more accurate determination of the fatigue damages for an electronic component and hardware system as the determination will be made based on real-world environmental conditions, rather than ideal or constant conditions.

Figure 1:
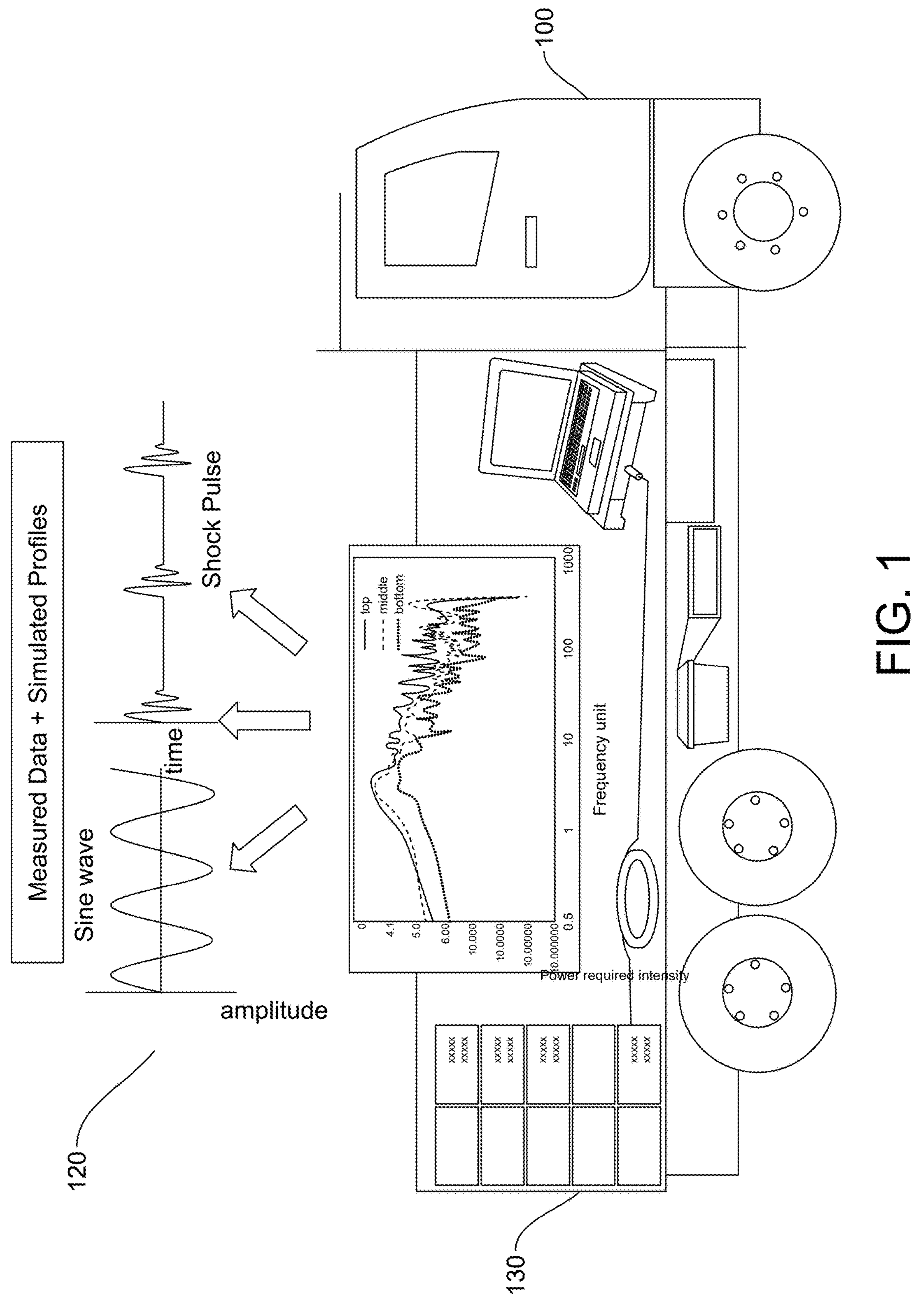
FIG. 1 shows an example of an environment of a vehicle transportation in accordance with aspects of the disclosure.

FIG. 1 shows an example of an environment for transporting electronic components. The electronic components may be transported in a mode of transportation, such as a vehicle, plane, train, bus, boat, and any equipment/machinery/robot that moves, etc. As shown, the electronic components 130 may be loaded into a truck 100 for transportation. The electronic components 130 may be electronic components for a data center. For example, the electronic components 130 may include highly integrated and delicate circuits, sockets, PCB, PCIe devices, and storage units. During transportation, the electronic components 130 may be exposed to environmental conditions. The environmental conditions may include, for example, bumpy roads, turbulence, sudden starts and stops, or the like. Random vibrations caused by these environmental conditions may induce fatigue damage to the electronic components 130 loaded into the cargo of the vehicle 100. The random vibration may be the sum of many sine waves 120 made up of various distributions of amplitude and frequency. Each sine wave 120 may reflect the motion of a particular part of the vehicle over time, such as the tires, suspension, and trailer, and the sum of the sine wave may contribute toward fatigue in every electronic component being transported.

Figure 2:
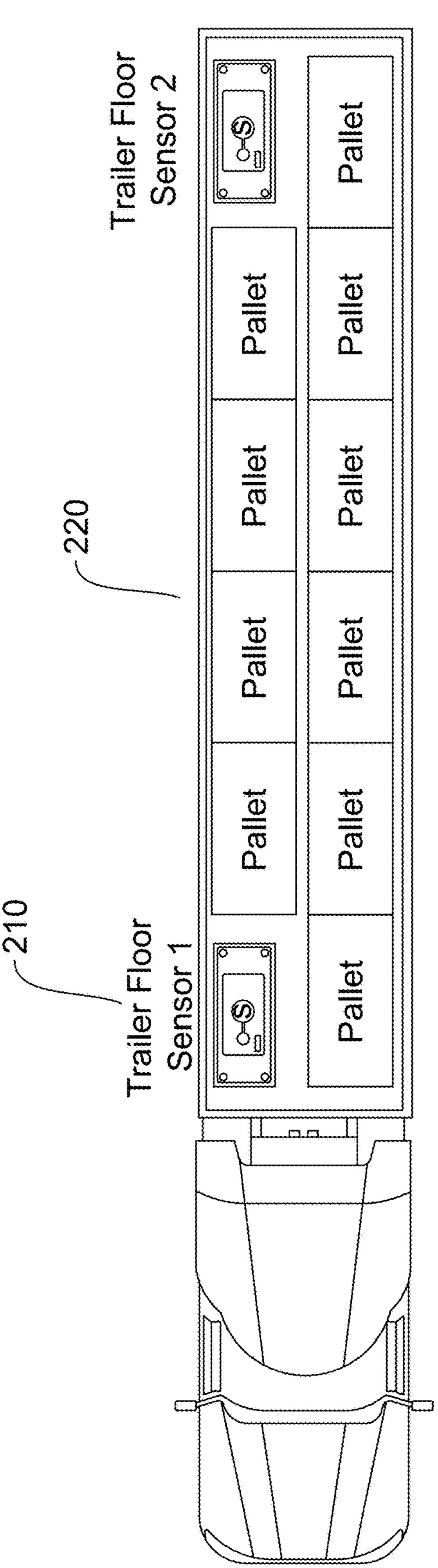
FIG. 2 shows another example of a vehicle transportation in accordance with aspects of the disclosure.

FIG. 2 shows another example environment for transporting electronic components. Portable data acquisition units 210 may be positioned within the cargo compartment of a transportation vehicle, e.g., a truck, to detect and record vibration data that may impact the electronic components. The portable data acquisition units 210 may be attached to a surface or critical structural elements of the transportation vehicle before the transportation vehicle begins traveling to its destination to deliver the electronic components. For example, if the transportation vehicle is a tractor trailer, as shown in FIG. 2, the portable data acquisition units 210 may be coupled, mounted, or attached to the floor of the transportation vehicle. In the case of the tractor trailer, the floor may be in the cab of the tractor trailer or the floor of the cargo compartment.

According to some examples, the floors may provide more accurate data regarding the vibrations and other environmental conditions as compared to the roof or other surface of the transportation vehicle. In some examples, the portable acquisition unit may be coupled to other locations within the transportation vehicle, such as the outside of a cardboard box or internally inside the products. Portable data acquisition units 210 are typically placed in proximity to the electronic components being transported. In some examples, multiple portable data acquisition units 210 may be positioned at various locations within the transportation vehicle to ensure full coverage of the vehicle's vibration conditions as well as full coverage of the entire duration of transportation or movement, which may span hours, days, or months. Multiple data acquisition units 210 may allow for the loading condition of electronic components 220 within the cargo compartment to be considered when determining the fatigue damage to the electronic components 220.

Figure 3:
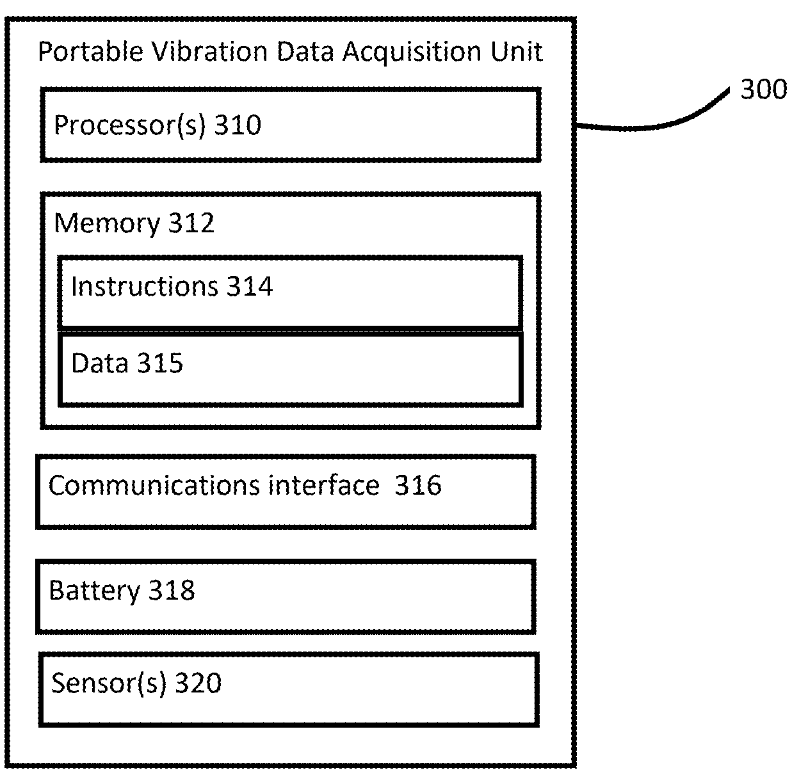
FIG. 3 is a block diagram illustrating the components of a portable vibration data acquisition unit in accordance with aspects of the disclosure.

FIG. 3 is a block diagram illustrating the components of a portable vibration data acquisition unit in accordance with an aspect of the disclosed technology. The portable vibration data acquisition unit 300 may include one or more processors 310, memory 312, instructions 314, communications interface 316, battery 318, and one or more sensors 320.

The memory 312 can store information accessible by the processors 310, including instructions 314 that can be executed by the processors 310. The memory 312 may also include data 315 that can be retrieved, manipulated, or stored by the processors 310. The memory 312 can be a type of non-transitory computer readable medium capable of storing information accessible by the processors 310, such as volatile and non-volatile memory. The processors 310 can include one or more central processing units (CPUs), graphic processing units (GPUs), field-programmable gate arrays (FPGAs), and/or application-specific integrated circuits (ASICs), such as tensor processing units (TPUs).

The instructions 314 can include one or more instructions that, when executed by the processors 310, cause the one or more processors 310 to perform actions defined by the instructions 314. The instructions 314 can be stored in object code format for direct processing by the processors, or in other formats including interpretable scripts or collections of independent source code modules that are interpreted on demand or compiled in advance.

The data 315 can be retrieved, stored, or modified by the processors 310 in accordance with the instructions 314. The data 315 can be stored in computer registers, in a relational or non-relational database as a table having a plurality of different fields and records, or as JSON, YAML, proto, or XML documents. The data 315 can also be formatted in a computer-readable format such as, but not limited to, binary values, ASCII, or Unicode. Moreover, the data 315 can include information sufficient to identify relevant information, such as numbers, descriptive text, proprietary codes, pointers, references to data stored in other memories, including other network locations, or information that is used by a function to calculate relevant data.

A portable vibration data acquisition unit 300 may incorporate various sensors 320 designed to detect vibration. The sensors may include, for example, accelerometers, such as digital capacitive accelerometers, piezoelectric accelerometer, piezoresistive accelerometer, etc. Other types of sensors that may be used include, for example, strain gauges, displacement sensors, velocity sensors, pressure sensors, force gauges, orientation sensors, such as gyroscopes and inertial measurement units (IMUs), GPS modules, etc. The accelerometers may be coupled to the portable data acquisition units 300. In some examples, the accelerometers may be mounted to and/or be within the portable data acquisition device. The sensors 320 may be configured to convert mechanical energy to electrical signals when experiencing acceleration. Various sensors may be applied and used in different environments. Processor 310 may be configured to receive vibration data from the sensors 320 and log the data in memory 312. The vibration data during the transport may be stored as a large data set. In some examples, the processors 310 may be configured to process the vibration data.

According to some examples, the data acquisition unit 300 may be at a node of a network and capable of directly and indirectly communicating with other nodes of the network. For example, the data acquisition unit 300 may transmit the data to a server via a network using communications interface 316.

The data acquisition unit 300 may offer real time vibration analysis in a unit so that maintenance, movement, direction, route, and preventive decisions can be made quickly in the field. In lab or field testing settings, the data acquisition unit 300 may offer real time vibration analysis in a unit so that testing and development and design decisions can be made quickly in real time. According to some examples, such as during long duration events, data acquisition unit 300 may transmit the vibration data to the server in real-time such that the data can be analyzed.

The vibration data may be analyzed to determine the fatigue that may affect the electronic components. An output of the analysis may be provided. For example, the output may include frequency, amplitude, time history information and statistical data related to the vibration data.

In some examples, Power Spectral Density (PSD) plots may be used to summarize random vibration data. Random vibration can be represented as the sum of many sine waves made up of various distributions of amplitude and frequency. Each sine wave may reflect the motions of a particular part of the vehicle over time, and the sum of the sine waves may contribute toward fatigue in every electronic component transported. Typical PSD generation techniques include bandpass filtering and Fast Fourier Transformation (FFT). Other standard vibration analysis output may also be used, such as pseudo velocity spectral density plots, velocity spectral density plots, and displacement spectral density plots.

Design choices regarding the electronic component and transportation choices may be used to mitigate fatigue damage to the electronic components and hardware systems. The design and transportation choices may be determined based on environment conditions, the type of electrical component, chassis, rack, packaging, and the like. In some examples, to determine the design and transportation choices, the vibration data may be analyzed and used. For example, the vibration data may be processed, or analyzed, using rainflow counting and bandpass filtering and any peak detection methods and timing logging methods. Bandpass filtering may be used to isolate the vibration data into specific frequencies. Rainflow counting can be used to identify each peak and valley of the vibration data. Any peak detection methods may be used that are suitable for a particular vibration data set. Any timing logging methods may be used to identify the exact timing of the peak and valley of the vibration data. The identified peaks and valleys may be used to determine design and testing decisions throughout product development and structural testing.

By understanding critical characteristics of the real world vibration data, better simulations or tests can be devised to simulate a design or test a prototype. These better simulations or tests will stress the design or prototype more accurately, which will produce more accurate fatigue damage results. A variety of designs for improved devices can be generated from these more accurate simulations or tests. These designs may allow for the construction of devices with higher safety factors, which can be used to drive cost or weight optimization decisions. Designs may also be evaluated against the simulations or tests performed as disclosed herein, to identify deficiencies in the quantity or type of materials, packaging, protection, structural strength, or other mitigation methods such as different modes of transportation, different routes of movement, or the complete stop of movement altogether. Other tests may be found to be insufficient as compared to the methods as disclosed herein. For example, a typical shaker table test using PSD methods to be a poor representation of the real world environment, requiring the tweaking of test parameters to find improvement or better correlation. Random vibration tests may be abandoned in part or entirely, in favor of other custom vibration tests such as sine dwell, sine-on-sine, multi-sine, or some form of real world field tests instead.

Figure 4:
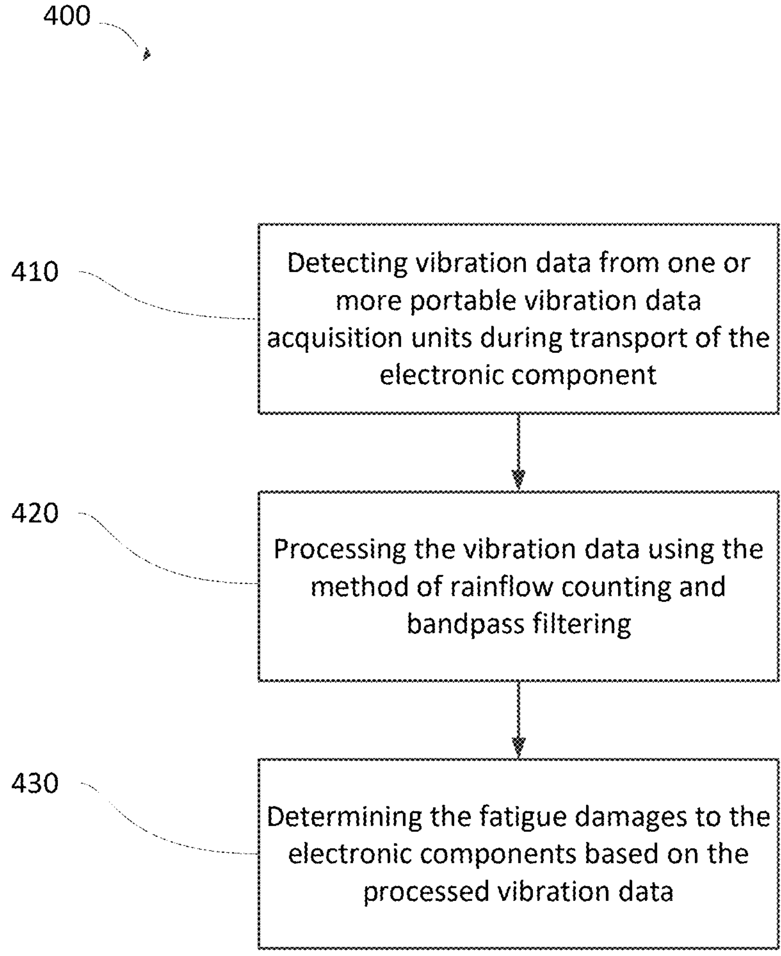
FIG. 4 is a flow diagram illustrating an example method in accordance with aspects of the disclosure.

FIG. 4 is a flow diagram for determining the fatigue damages to the electronic components based on vibration data. The following operations do not have to be performed in the precise order described below. Rather, various operations can be handled in a different order or simultaneously, and operations may be added or omitted. While the operations are described with reference to vibrations detected during transport, the techniques described can be used in lab settings or any kind of industrial or real world settings where some electronic components and hardware systems are moved in some way.

In block 410, during transport of the electronic components, vibration data from one or more portable vibration data acquisition units may be detected. The portable data acquisition units may include one or more sensors located in proximity to the electronic component. For example, multiple portable vibration data acquisition units can be installed on a single transportation vehicle. The portable vibration data acquisition units may be positioned near the products to such that the portable vibration data acquisition units experience similar vibrations to the electronic component.

According to some examples, the vibration data may be stored in memory. The memory may be coupled to the portable vibration data acquisition units. In some examples, the stored vibration data may be sent to the one or more processors over a network.

The portable vibration data acquisition units may be attached to a floor of a vehicle transporting the electronic component. The vehicle may be, for example, a car, truck, tractor trailer, train, ship, or plane, or any equipment, machinery, or robots that move. In some examples, the portable vibration data acquisition units may be located in a package of the electronic components.

In block 420, the vibration data may be processed. The vibration data may be processed using rainflow counting and/or bandpass filtering and/or any peak detection methods and/or timing logging methods. For example, acceleration or stress cycles may be measured using rainflow counting and bandpass filtering and any peak detection methods and timing logging methods.

According to some examples, processing the vibration data may include extracting a specific frequency range of the vibration data, generating cycles by identifying a maximum value and minimum value in the specific frequency range and identifying precise timing of these values, and calculating or determining statistical information based on the cycles.

In block 430, the fatigue damages to the electronic component may be determined based on the processed vibration data. The fatigue damages may be correlated to segments of the transport. The segments of the transport may be a plurality of travel distances from one location along a route to another location along the route within a threshold period of time during transport of the electronic component.

In some examples, determining the fatigue damages may include predicting, based on cycles, a stress cycle per unit time. In another example, determining the fatigue damages may include predicting fatigue life in a supply chain by providing information of fatigue damage under a specific condition. In yet another example, determining the fatigue damages may include predicting optimization information for packaging the electronic components. The packaging may include, for example, a material and design of the packaging. The material and design of the packaging may include, for example, the size of the shipping container, the type of protective material, the type of shipping container, or the like. The shipping container may be, for example, a plastic bag, envelope, padded envelope, cardboard box, wooden box, metal box, or the like. In some examples, the type of protective material may be air packets, packing peanuts, air bubble packing, or the like.

Figure 5:
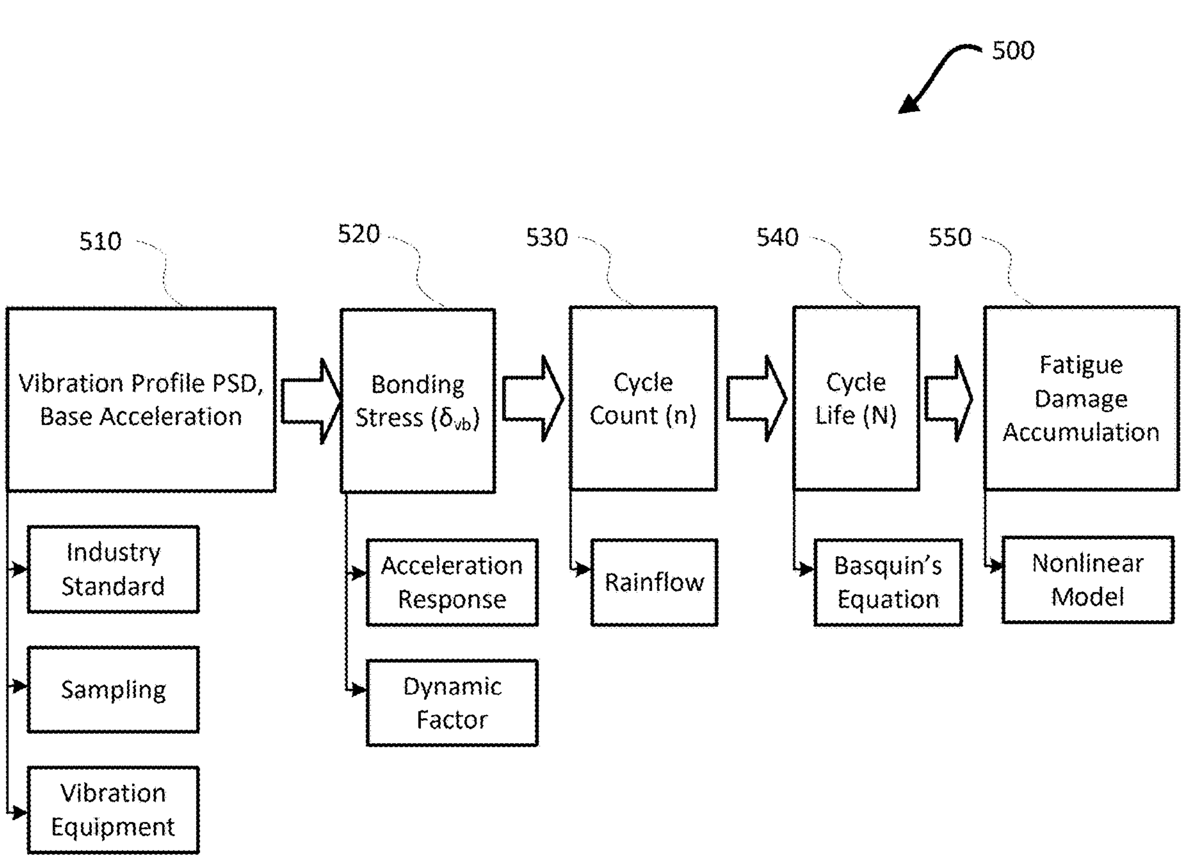
FIG. 5 is a flow diagram illustrating example algorithms for implementing a vibration data analysis system in accordance with aspects of the disclosure.

FIG. 5 is a flow diagram for determining fatigue damages to an electronic component. The following operations do not have to be performed in the precise order described below. Rather, various operations can be handled in a different order or simultaneously, and operations may be added or omitted.

In block 510, vibration data is measured. For example, the vibration data may be measured using one or more sensors during movement of electronic components. Such movement may include any type of real-world movement, such as transport through a global supply chain, movement along machine or robotic elements in a manufacturer or warehouse facility, movement by a user as the electronic components are carried or worn, etc.

In block 520, cycle, amplitude, timing and frequency count are determined. For example, rainflow counting, bandpass filtering, peak detection, and timing detection may be used to assess the bending stress experienced by an electronic component due to vibration. Bandpass filtering may isolate the vibration signals within a specific frequency range that is relevant to the bending behavior of the component. The identification of certain frequencies may allow for bending stress levels of the electronic component to be determined.

The number of stress cycles may be determined using rainflow counting. Rainflow counting may identify and/or quantify individual stress cycles within the filtered signal. Rainflow counting may consider both the amplitude and duration of each stress cycle. Rainflow counting may provide an accurate measure of the cyclic loading. In some instances, such as in determining the number of acceleration cycle, other peak detection methods may be more suitable depending on the characteristic of the signal being captured. Moreover, timing information may be used to correlate the detected peaks with actions of a transportation vehicle, robot, etc. Moreover, the timing information may be used to reproduce measured conditions in computer simulations and lab environments.

In block 530, mechanical stress is determined. For example, it may be determined using formulas, computer simulations, and test equipment.

In block 540, the cycle life of the component can be determined. Cycle life may correspond to the number of stress cycles a component can withstand before failure or fatigue damage occurs. This cycle life of an electronic component may be used to predict the lifespan and durability of the component under the given vibration conditions.

In block 550, based on the cycle life data and the known fatigue properties of the material, the accumulation of fatigue damage can be estimated. Fatigue damage accumulation may include the effects of repeated stress cycles over time, leading to the gradual degradation of the component's structural integrity and micro crack propagation. Therefore, the accumulation of fatigue damage may provide an indication regarding the long-term structural integrity of the component under the given vibration conditions.

Through the estimation of fatigue damage, it can be determined the number of stress cycles to which the electronic component is subjected per unit of time, and the total duration of time. Additionally, the estimated fatigue damage may provide information on the test pass rate and the ability of components to withstand transportation and/or shipping and/or movement in certain geographic regions, such as within and/or across the United States, Europe, and Asia, for a threshold period of time without the electronic components suffering fatigue damage. According to some examples, the environmental conditions and related data may be used to design and/or conduct laboratory experiments to determine the fatigue life of an electronic component, determine and/or identify packaging material to elongate an electronic component's life cycle, or the like. In some examples, environmental conditions and related data may be used to determine electronic component design specifications to increase the robustness of the electronic component. For example, altering the electronic component design specifications to increase the robustness of the electronic component for transportation may optimize cost and waste from a packaging standpoint.

Based on the analysis of the environmental conditions and the related data, e.g., random vibration data, one or more types of transportation vehicles may be identified to decrease fatigue damage during transportation. For example, if the analysis reveals that certain components are highly sensitive to vibrations, a mode of transportation may be provided that reduces the vibrations. In one example, if the analysis for a given electronic component indicates that an electronic component is more susceptible to fatigue damage due to sudden starts and stop, a certain type of transportation vehicle that does not experience sudden starts and stops, e.g., a boat, a train, etc., may be the suggested mode of transportation. In some examples, the analysis for the electronic component may indicate that the electronic component would experience more fatigue damage if there are altitude changes as compared to remaining below a threshold atmospheric pressure, airplanes may be removed from the list of suggested modes of transportation.

In some examples, one or more routes may be suggested based on the analysis of environmental conditions and the related data. For example, if the analysis reveals that certain roads are known to cause excessive vibrations or mechanical shocks, routes avoiding those roads may be suggested.

According to some examples, fatigue damage in electronic components may be due to environmental conditions, such as the weather. The weather may be seasonal, such as a rainy season in a certain area, high temperatures during certain months, long periods of cold temperatures, or the like. Based on the analysis of environmental conditions and related data, certain periods of time, certain times of the year, and/or certain weather conditions may be provided as a suggestion for transporting the electronic components. The suggestions may be used by manufacturers and shippers to plan when to manufacture the goods and/or when to ship the electronic components to avoid critical periods, to avoid certain weather and/or seasons, or take additional precautions. The additional precautions may include, for example, transporting electronic components in a refrigerated vehicle if excessive heat will cause fatigue damage or, alternatively, in a heated vehicle if excessive cold will cause fatigue damage.

Figure 6:
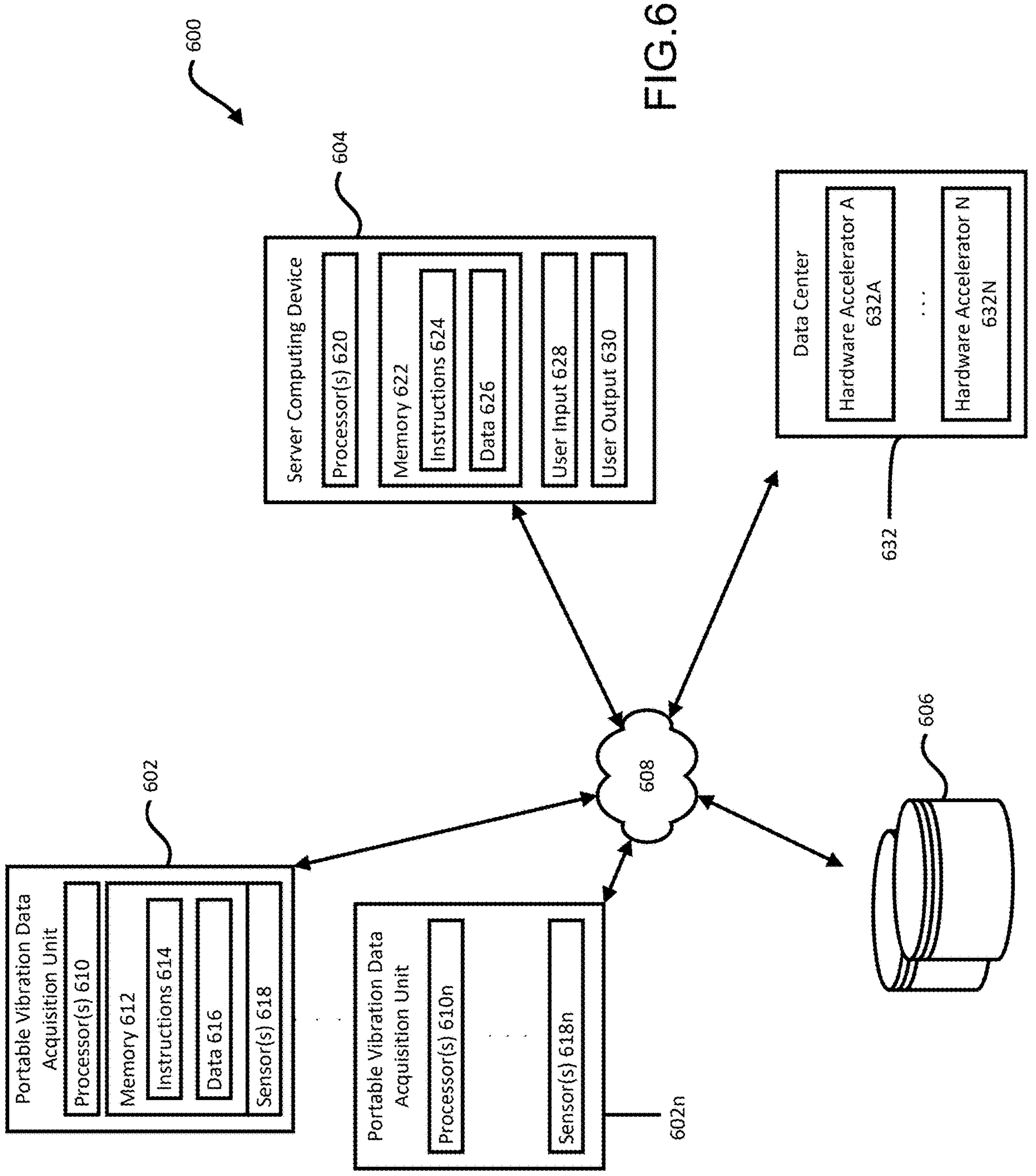
FIG. 6 is a block diagram of an example environment for implementing a vibration data analysis system in accordance with aspects of the disclosure.

FIG. 6 is a block diagram of an example environment for implementing a vibration data analysis system 600 in accordance with an aspect of the disclosed technology. The vibration data analysis system 600 can be implemented on one or more devices having one or more processors in one or more locations, such as in server computing device 604. Client computing device 602 and the server computing device 604 can be communicatively coupled to one or more storage devices 606 over a network 608. The storage devices 606 can be a combination of volatile and non-volatile memory and can be at the same or different physical locations than the computing devices 602, 604. For example, the storage devices 606 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 604 can include one or more processors 620 and memory 622. The memory 622 can store information accessible by the processors 620, including instructions 624 that can be executed by the processors 620. The memory 622 can also include data 616 that can be retrieved, manipulated, or stored by the processors 620. The memory 622 can be a type of non-transitory computer readable medium capable of storing information accessible by the processors 620, such as volatile and non-volatile memory. The processors 620 can include one or more central processing units (CPUs), graphic processing units (GPUs), field-programmable gate arrays (FPGAs), and/or application-specific integrated circuits (ASICs), such as tensor processing units (TPUs).

The instructions 624 can include one or more instructions that, when executed by the processors 620, cause the one or more processors to perform actions defined by the instructions 624. The instructions 624 can be stored in object code format for direct processing by the processors 620, or in other formats including interpretable scripts or collections of independent source code modules that are interpreted on demand or compiled in advance. The vibration data analysis system 600 can be executed using the processors 620, and/or using other processors remotely located from the server computing device 604.

The data 626 can be retrieved, stored, or modified by the processors 620 in accordance with the instructions 624. The data 626 can be stored in computer registers, in a relational or non-relational database as a table having a plurality of different fields and records, or as JSON, YAML, proto, or XML documents. The data 626 can also be formatted in a computer-readable format such as, but not limited to, binary values, ASCII, or Unicode. Moreover, the data 626 can include information sufficient to identify relevant information, such as numbers, descriptive text, proprietary codes, pointers, references to data stored in other memories, including other network locations, or information that is used by a function to calculate relevant data.

The client computing device 602 can also be configured similarly to the server computing device 604, with one or more processors 610, memory 612, instructions 614, data 616, and one or more sensors 618, which can correspond to the portable data acquisition unit 300 of FIG. 3.

The server computing device 604 can be configured to transmit data to the client computing device 602, and the client computing device 602 can be configured to display at least a portion of the received data on a display implemented as part of the user output 630. The user output 630 can also be used for displaying an interface between the client computing device 602 and the server computing device 604. The user output 630 can alternatively or additionally include one or more speakers, transducers or other audio outputs, a haptic interface or other tactile feedback that provides non-visual and non-audible information to the platform user of the client computing device 602.

Although FIG. 6 illustrates the processors 610, 620 and the memories 612, 622 as being within the computing devices 604, 602, components described herein can include multiple processors and memories that can operate in different physical locations and not within the same computing device. For example, some of the instructions 624, 224 and the data 626, 626 can be stored on a removable SD card and others within a read-only computer chip. Some or all of the instructions and data can be stored in a location physically remote from, yet still accessible by, the processors 610, 620. Similarly, the processors 610, 620 can include a collection of processors that can perform concurrent and/or sequential operation. The computing devices 602, 604 can each include one or more internal clocks providing timing information, which can be used for time measurement for operations and programs run by the computing devices 602, 604.

The server computing device 604 can be connected over the network 608 to a data center 632 housing any number of hardware accelerators 632A-N. The data center 632 can be one of multiple data centers or other facilities in which various types of computing devices, such as hardware accelerators, are located. Computing resources housed in the data center 632 can be specified for deploying models related to time series forecasting as described herein.

The server computing device 604 can be configured to receive requests to process data from the client computing device 602 on computing resources in the data center 632. For example, the environment can be part of a computing platform configured to provide a variety of services to users, through various user interfaces and/or application programming interfaces (APIs) exposing the platform services. The variety of services can include performing vibration data analysis. The client computing device 602 can transmit input data associated with vibration data. The vibration data analysis system 600 can receive the input data, and in response, generate output data including fatigue damage.

Figure 7:
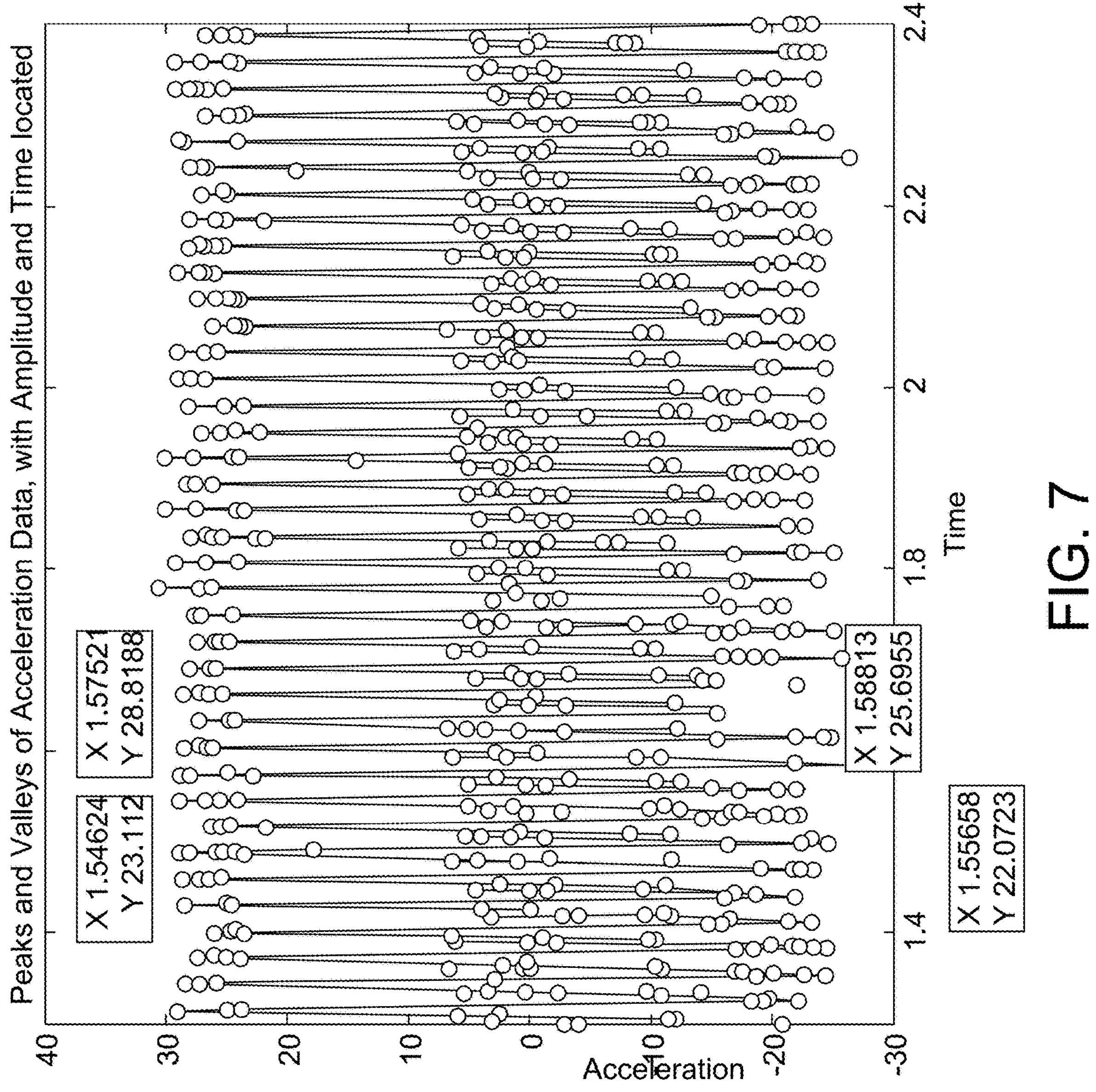
FIG. 7 is an example graph according to aspects of the disclosure.

FIG. 7 illustrates an example plot of peaks and valleys of acceleration data, with amplitude and time located.

Figure 8:
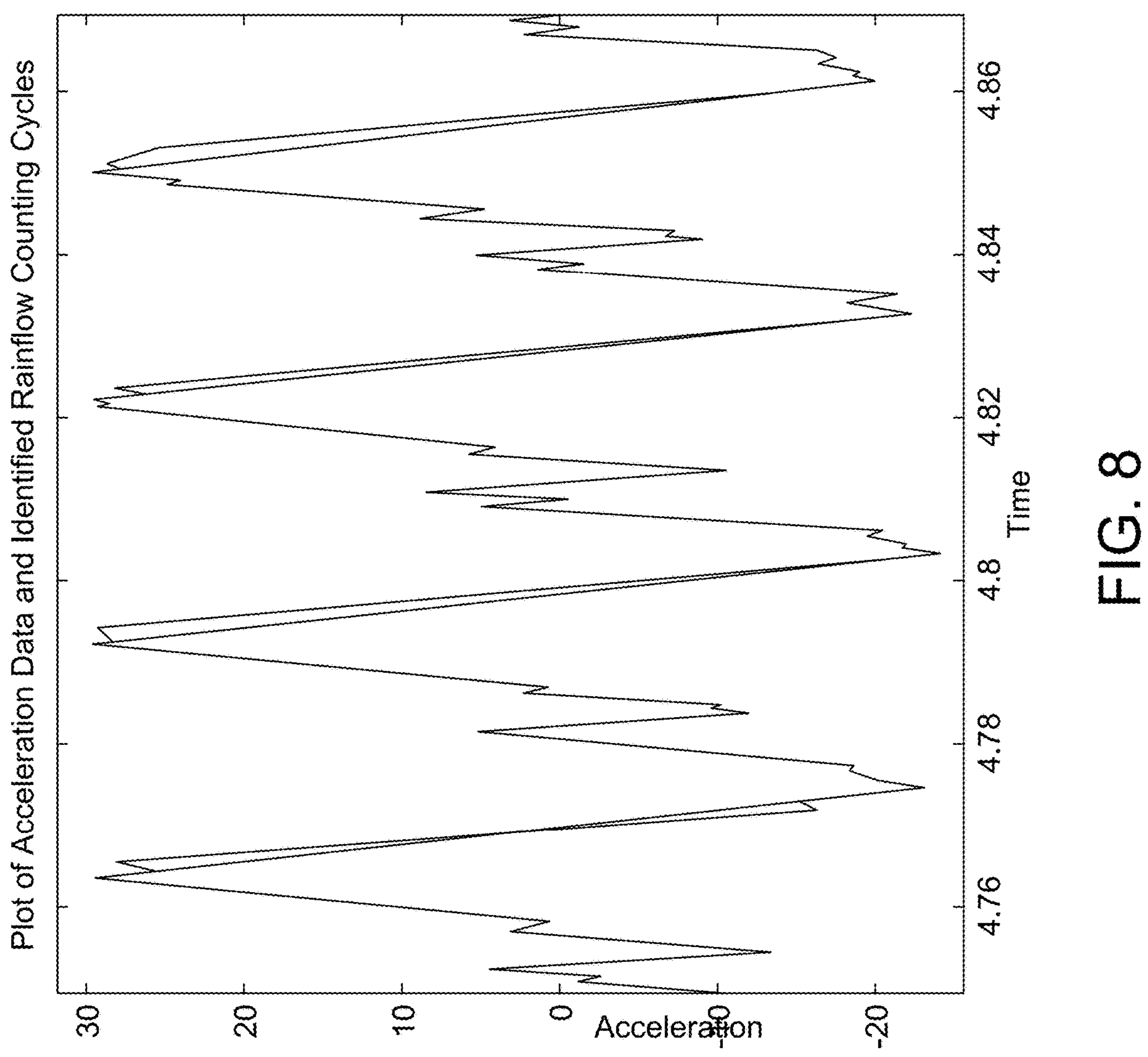
FIG. 8 is another example graph according to aspects of the disclosure.

FIG. 8 illustrates an example plot of acceleration data and identified rainflow counting cycles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for determining fatigue damages to an electronic component caused by movement of the electronic component, the method comprising:

detecting, during transport of the electronic component, vibration data from one or more portable vibration data acquisition units, each portable vibration data acquisition unit comprising one or more sensors located in proximity to the electronic component;

determining, with one or more processors, characteristics of the vibration data, the characteristics including one or more of frequency, amplitude, timing, and cycle count, wherein determined characteristics are correlated to segments of the movement; and determining, with the one or more processors, the fatigue damages to the electronic components based on the characteristics of the vibration data.

2. The method of claim 1, the method further comprising:

storing the vibration data in memory coupled to portable vibration data acquisition units; and transmitting the stored vibration data to the one or more processors over a network.

3. The method of claim 1, wherein when processing the vibration data, the method further comprises:

extracting a specific frequency range of the vibration data;

generating cycles by identifying a maximum value and minimum value in the specific frequency range; and generating timing information by identifying a precise time the maximum value and minimum value occur; and determining time history information and statistical information based on the cycles.

4. The method of claim 1, wherein determining the fatigue damages further comprises predicting, based on cycles per unit time and total duration, cumulative stress cycles per segment.

5. The method of claim 1, wherein when determining the fatigue damages the method further comprises predicting a test pass rate or total accumulated damage for a specific test profile.

6. The method of claim 1, wherein when determining the fatigue damages the method further comprises predicting a robustness of an electronic component or hardware system in a supply chain by providing information of durability under a specific condition.

7. The method of claim 6, wherein when determining the fatigue damages the method further comprises predicting optimization information for packaging the electronic component and/or hardware system.

8. The method of claim 7, wherein the optimization information for the packaging comprises determining a material and design of packaging.

9. The method of claim 1, wherein the one or more portable vibration data acquisition units are coupled to a floor or critical structural elements of a mode of transportation or movement for the electronic component.

10. The method of claim 9, wherein the mode of transportation is a car, truck, tractor trailer, train, ship, or plane.

11. The method of claim 1, wherein the one or more portable vibration data acquisition units are located in a package of electronic components.

12. The method of claim 1, wherein the segments of the transport is plurality of travel distances from one location along a route to another location along the route within a threshold time during transport of the electronic component.

13. A system for determining fatigue damages to an electronic component caused by movement of the electronic component comprising:

one or more portable vibration data acquisition units comprising one or more sensors configured to detect vibration data during transport of the electronic component; and one or more processors, the one or more processors configured to:

determine characteristics of the vibration data, the characteristics including at least one of frequency, amplitude, timing, or cycle count, wherein the characteristics are correlated to segments of the movement; and determine the fatigue damages to the electronic components based on the processed vibration data, wherein the determined fatigue damages are correlated to segments of the transport.

14. The system of claim 13, wherein the one or more portable vibration data acquisition units further comprise:

memory configured to store the detected vibration data; and a communications interface configured to transmit the detected vibration data to the one or more processors over a network.

15. The system of claim 13, wherein when processing the vibration data, the one or more processors are further configured to:

extract a specific frequency range of the vibration data;

generate cycles by identifying a maximum value and minimum value in the specific frequency range; and generating timing information by identifying a precise time the maximum value and minimum value occur; and determine statistical information based on the cycles.

16. The system of claim 13, wherein when determining the fatigue damages, the one or more processors are further configured to predict robustness of an electronic component or hardware system in a supply chain by providing information of durability under a specific condition.

17. The system of claim 13, wherein when determining the fatigue damage, the one or more processors are further configured to predict optimization information for packaging the electronic components.

18. The system of claim 13, further comprising a mode of transportation, wherein the one or more portable vibration data acquisition units are coupled to a floor or critical structural element of the mode of transportation for the electronic component.

19. The system of claim 18, wherein the mode of transportation is a car, truck, tractor trailer, train, ship, or plane.

20. The system of claim 13, wherein the one or more portable vibration data acquisition units are located in a package of an electronic component.

* * * * *